US007984039B2

(12) United States Patent
Carmel et al.

(10) Patent No.: US 7,984,039 B2
(45) Date of Patent: Jul. 19, 2011

(54) MERGING OF RESULTS IN DISTRIBUTED INFORMATION RETRIEVAL

(75) Inventors: David Carmel, Haifa (IL); Adam Darlow, Haifa (IL); Shai Fine, Ra'anana (IL); Elad Yom-Tov, Hoshaya (IL)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 11/183,086

(22) Filed: Jul. 14, 2005

(65) Prior Publication Data
US 2007/0016574 A1   Jan. 18, 2007

(51) Int. Cl.
G06F 7/00 (2006.01)
G06F 17/30 (2006.01)

(52) U.S. Cl. ......... 707/713; 707/718; 707/719; 707/765

(58) Field of Classification Search ............ 707/5
See application file for complete search history.

(56) References Cited

U.S. PATENT DOCUMENTS

| | | | |
|---|---|---|---|
| 5,742,806 A * | 4/1998 | Reiner et al. ............ | 707/3 |
| 5,826,260 A * | 10/1998 | Byrd et al. ............ | 707/5 |
| 5,864,845 A | 1/1999 | Voorhees et al. | |
| 6,289,334 B1 * | 9/2001 | Reiner et al. ............ | 707/3 |
| 6,370,527 B1 | 4/2002 | Singhal | |
| 6,574,632 B2 | 6/2003 | Fox et al. | |
| 6,889,254 B1 * | 5/2005 | Chandra et al. ............ | 709/224 |
| 7,162,512 B1 * | 1/2007 | Amit et al. ............ | 709/206 |
| 7,206,780 B2 * | 4/2007 | Slackman ............ | 707/7 |
| 7,251,222 B2 * | 7/2007 | Chen et al. ............ | 370/256 |
| 7,363,299 B2 * | 4/2008 | Dalvi et al. ............ | 707/3 |
| 7,444,348 B2 * | 10/2008 | Fries et al. ............ | 707/102 |
| 2002/0032676 A1 * | 3/2002 | Reiner et al. ............ | 707/3 |
| 2002/0184206 A1 * | 12/2002 | Evans ............ | 707/4 |
| 2003/0041054 A1 * | 2/2003 | Mao et al. ............ | 707/3 |
| 2004/0078251 A1 * | 4/2004 | DeMarcken ............ | 705/5 |
| 2004/0215607 A1 * | 10/2004 | Travis, Jr. ............ | 707/3 |

(Continued)

FOREIGN PATENT DOCUMENTS
EP            1353279 A1 * 10/2003

OTHER PUBLICATIONS

Rasolofo et al. Approaches to collection selection and results merging for distributed information retrieval. Conference on Information and Knowledge Management archive Proceedings of the tenth international conference on Information and knowledge management table of contents Atlanta, Georgia, pp. 191-198, Oct. 2001 ISBN:1-58113-436-3.*

(Continued)

*Primary Examiner* — Kavita Padmanabhan
*Assistant Examiner* — Berhanu Mitiku

(57) ABSTRACT

A method and system are provided of merging results in distributed information retrieval. A search manager is in communication with a plurality of components, wherein a component is a search engine working on a document collection and returning results in the form of a list of documents to a search query. The search manager submits a query to the plurality of components, receives results from each component in the form of a list of documents; estimates the success of a component in handling the query to generate a merit score for a component per query; applies the merit score to the results for the component; and merges results from the plurality of components by ranking in order of the applied merit score.

12 Claims, 7 Drawing Sheets

U.S. PATENT DOCUMENTS

| | | | | |
|---|---|---|---|---|
| 2005/0091193 | A1* | 4/2005 | Frank et al. | 707/1 |
| 2005/0091209 | A1* | 4/2005 | Frank et al. | 707/3 |
| 2005/0097092 | A1* | 5/2005 | Annau et al. | 707/3 |
| 2005/0131893 | A1* | 6/2005 | Von Glan | 707/5 |
| 2005/0193088 | A1* | 9/2005 | Dittrich et al. | 709/217 |
| 2005/0283465 | A1* | 12/2005 | Dettinger et al. | 707/3 |
| 2006/0143159 | A1* | 6/2006 | Chowdhury et al. | 707/3 |
| 2006/0167842 | A1* | 7/2006 | Watson | 707/3 |
| 2006/0173830 | A1* | 8/2006 | Smyth et al. | 707/3 |
| 2008/0077570 | A1* | 3/2008 | Tang et al. | 707/5 |

OTHER PUBLICATIONS

Wiegand et al. "Extending XML Web Querying to Hetrogeneous Geospatial Information" National Conference on Digital Government Research (2002, 2003, 2004) http://www.lic.wisc.edu/DG_Project/DGhomepage.html.*

Chen et al. "NiagaraCQ: A Scalable Continuous Query System for Internet Databases" May 2000 ACM SIGMOD Record, Proceedings of the 2000 ACM SIGMOD international conference on Management of data SIGMOD '00, vol. 29 Issue 2 Publisher: ACM Press.*

Kossmann, "The State of the Art in Distributed Query Processing" Dec. 2000 ACM Computing Surveys (CSUR), vol. 32 Issue 4 Publisher: ACM Press.*

Ozcan et al. "Dynamic Query Optimization on a Distributed Object Management Platform" Software Research and Development Center Middle East Technical University (METU) 06531 Ankara Turkey.*

Amati et al. "Query difficulty, robustness and selective application of Query expansion" Fondazione Ugo Bordoni Rome Italy.*

Amsaleg et al. "Dynamic Query Operator Scheduling forWide-Area Remote Access" Distributed and Parallel Databases, 6, 217-246 (1998) 1998 Kluwer Academic Publishers, Boston. Manufactured in The Netherlands.*

Chen et al. "NiagaraCQ: A Scalable Continuous Query System for Internet Databases" Computer Sciences Department, University of Wisconsin-Madison ACM 2000.*

Kossmann "The State of the Art in Distributed Query Processing" ACM Computing Surveys, vol. 32, No. 4, Dec. 2000, pp. 422-469.*

Pan et al. "Mediator Systems in E-Commerce Applications" Proceedings of the 4th IEEE Int'l Workshop on Advanced Issues of E-Commerce and Web-Based Information Systems (WECWIS 2002).*

Purvis et al. "The NZDIS Project: an Agent-Based Distributed Information Systems Architecture" Copyright 2000 IEEE. Published in the Proceedings of the Hawai'i International Conference on System Sciences, Jan. 4-7, 2000, Maui, Hawaii.*

Si et al. "A Language Modeling Framework for Resource Selection and Results Merging"CIKM '02, Nov. 4-9, 2002, McLean, Virginia, USA Copyright 2002 ACM.*

Selberg, Erik et al., (1995), "Multi-service search and comparison using the MetaCrawler", Proceedings of the 4th International World-Wide Web Conference, Darmstadt, Germany.

Cori (J. Callan, Z. Lu, and W. Croft, "Searching distributed collections with inference networks", in proceedings of the 18th Annual International ACM SIGIR Conference on Research and Development in Information Retrieval, pp. 21-28, Seattle, Washington, 1995).

ProFusion (Gauch, Susan et al., (1996), "Profusion: Intelligent fusion from multiple, distributed search engines", Journal of Universal Computing, 2, 637-649).

Joachims, Thorsten, (2002), "Optimizing search engines using clickthrough data", proceedings of the ACM Conference on Knowledge Discovery and Data Mining (KDD), Association of Computer Machinery.

U.S. Appl. No. 10/968,692, "Prediction of Query Difficulty for a Generic Search Engine", David Carmel, et al., filed Oct. 19, 2004.

* cited by examiner

MERGING OF RESULTS IN DISTRIBUTED INFORMATION RETRIEVAL

FIELD OF THE INVENTION

This invention relates to the field of distributed information retrieval. In particular, this invention relates to merging of results in distributed information retrieval according to difficulty estimation.

BACKGROUND OF THE INVENTION

The traditional Information Retrieval (IR) framework is one where a single search engine retrieves documents from a single document collection. However, this can be generalized to the case where one or more search engine queries one or more document collections, and the results from the different dataset and search engine pairs are merged to form a single ranking of documents. This setting is known as distributed information retrieval.

In general, the case where a single engine queries several collections is known as federation, whereas the case of multiple search engines querying the same collection is known as metasearch.

The problem in merging search results is that both search engines and document collections are not created equal. Search engines differ in their indexing methods, term weighting schemes, and document weighting schemes, while document collections differ in the type and relevancy of the documents they contain.

In the Information Retrieval field the process of fusion is usually divided into three phases: collection selection, document selection, and merging. The aim in collection selection is to narrow the queried datasets to the most relevant collections, thus reducing the amount of noise present. Document selection is the process of deciding how many documents should be retrieved from each collection, the simplest being an identical number of documents. Finally, merging is the process of generating a unified list from the retrieved documents.

Most search engines provide very little information, in addition to the document rankings, with which to perform the merging. The document score (DS) assigned by a search engine to a document retrieved from a collection might or might not be provided. In the former case, the DS can be used as additional information for merging. However, it is difficult to re-rank the documents since DSs are local for each specific dataset and engine combination. This can be avoided by computing global statistics, for example, the IDF (inverse document frequency) of the query terms as though all datasets were merged to a single collection. In the latter, only the document ranking and some a priori knowledge about the datasets can be used for merging the different results sets.

Selberg, E. & Etzioni, O. (1995), "Multi-service search and comparison using the MetaCrawler", Proceedings of the 4th International World-Wide Web Conference, Darmstadt, Germany, utilizes document rank and its appearance in the results list of several engines to perform merging. This is done by summing the rank of duplicate documents. Other approaches to the problem of merging are achieved by assigning a weight to every ranking, such that each collection is given a score based on its statistics. This ranking is then used for merging the different rankings by weighting the DSs.

Two known algorithms that use this approach are CORI (J. Callan, Z. Lu, and W. Croft, "Searching distributed collections with inference networks.", in proceedings of the 18th Annual International ACM SIGIR Conference on Research and Development in Information Retrieval, pages 21-28, Seattle, Wash., 1995.), which is applicable to the framework of federation, and ProFusion (Gauch, S., Wang, G., & Gomez, M. (1996), "Profusion: Intelligent fusion from multiple, distributed search engines.", Journal of Universal Computing, 2, 637-649), created for metasearch. CORI requires, in addition to DSs, term probabilities and IDF's. ProFusion creates an engine-specific weight by measuring the precision at 10 (P@10) of each search engine over a known set of 25 queries.

More recently, Joachims, T. (2002), "Optimizing search engines using clickthrough data." Proceedings of the ACM Conference on Knowledge Discovery and Data Mining (KDD), Association of Computer Machinery, demonstrated a user-driven approach to metasearch. This system learns particular users' preference based on past user activity to assign weight to individual search engines. Thus, this system is similar to ProFusion, the main difference being that weights are assigned based on individual user preference rather than search engine precision.

The proposed approach is based on a method of providing an estimation of the success a search engine working on a dataset had on a given query. This estimation is used to decide which search engine and dataset pair are more likely to have retrieved better documents, and thus the documents retrieved from them should be ranked higher.

The approach is based on the assumption that only minimal information is supplied by the search engine operating on a specific dataset. Access may be provided to the score of documents (i.e. the DSs) or document ranks and to the document term frequency (DF) of all query terms. Thus the method we describe uses less information than the prior art methods.

SUMMARY OF THE INVENTION

According to a first aspect of the present invention there is provided a method of merging results in distributed information retrieval, comprising: submitting a query to a plurality of components, wherein a component is a search engine working on a document collection; receiving results from each component in the form of a list of documents; estimating the success of a component in handling the query to generate a merit score for a component per query; applying the merit score to the results for the component; and merging results from the plurality of components by ranking in order of the applied merit score.

According to a second aspect of the present invention there is provided a system for merging results in distributed information retrieval, comprising: a search manager in communication with a plurality of components, wherein a component is a search engine working on a document collection and returning results in the form of a list of documents to a search query, the search manager including: a merit estimator for estimating the success of a component in handling a query to generate a merit score for a component per query; an application means for applying the merit score to the results for the component; and a ranker for merging results from the plurality of components by ranking in order of the applied merit score.

According to a third aspect of the present invention there is provided a computer program product stored on a computer readable storage medium, comprising computer readable program code means for performing the steps of: submitting a query to a plurality of components, wherein a component is a search engine working on a document collection; receiving results from each component in the form of a list of documents; estimating the success of a component in handling the query to generate a merit score for a component per query; applying the merit score to the results for the component; and merging results from the plurality of components by ranking in order of the applied merit score.

The results from each component may have document scores (DS) to which the merit score is applied.

The steps may include: dividing a query into a multiplicity of sub-queries and providing the query and said multiplicity of sub-queries to a component; and receiving results of the query and sub-queries from the component. The sub-queries may be at least one of the following: keywords, lexical affinities, synonyms and dictionary definitions.

Estimating the success of a component in handling the query may include determining the extent of overlap between the results for the query and the results for said sub-queries. Estimating the success of a component in handling the query may include applying a predetermined component weighting. The predetermined component weighting may be obtained by estimating the success of a component in handling a plurality of queries with known results. The step of estimating may use a binary tree predictor or histogram predictor to determine how well the query is answered.

The steps may include determining whether or not to apply the merit score to the results based on the variance of merit scores across the components. The merit score may be applied if the variance is above a predetermined threshold level, if not a non-merit score based merging method is used.

According to a fourth aspect of the present invention there is provided a method of providing a service to a customer over a network, comprising: submitting a query to a plurality of components, wherein a component is a search engine working on a document collection; receiving results from each component in the form of a list of documents; estimating the success of a component in handling the query to generate a merit score for a component per query; applying the merit score to the results for the component; and merging results from the plurality of components by ranking in order of the applied merit score.

The method of providing a service may include one or more of the method steps defined in relation to the computer program product.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A search system is provided in which a search manager device receives lists of ranked documents retrieved from one or more search engines retrieving from one or more data collections and compiles the document results into a ranked list of documents. The search manager ranks the results dynamically on a per query basis. The search manager uses a prediction of how well each search engine is able to answer the query.

Figure 1:
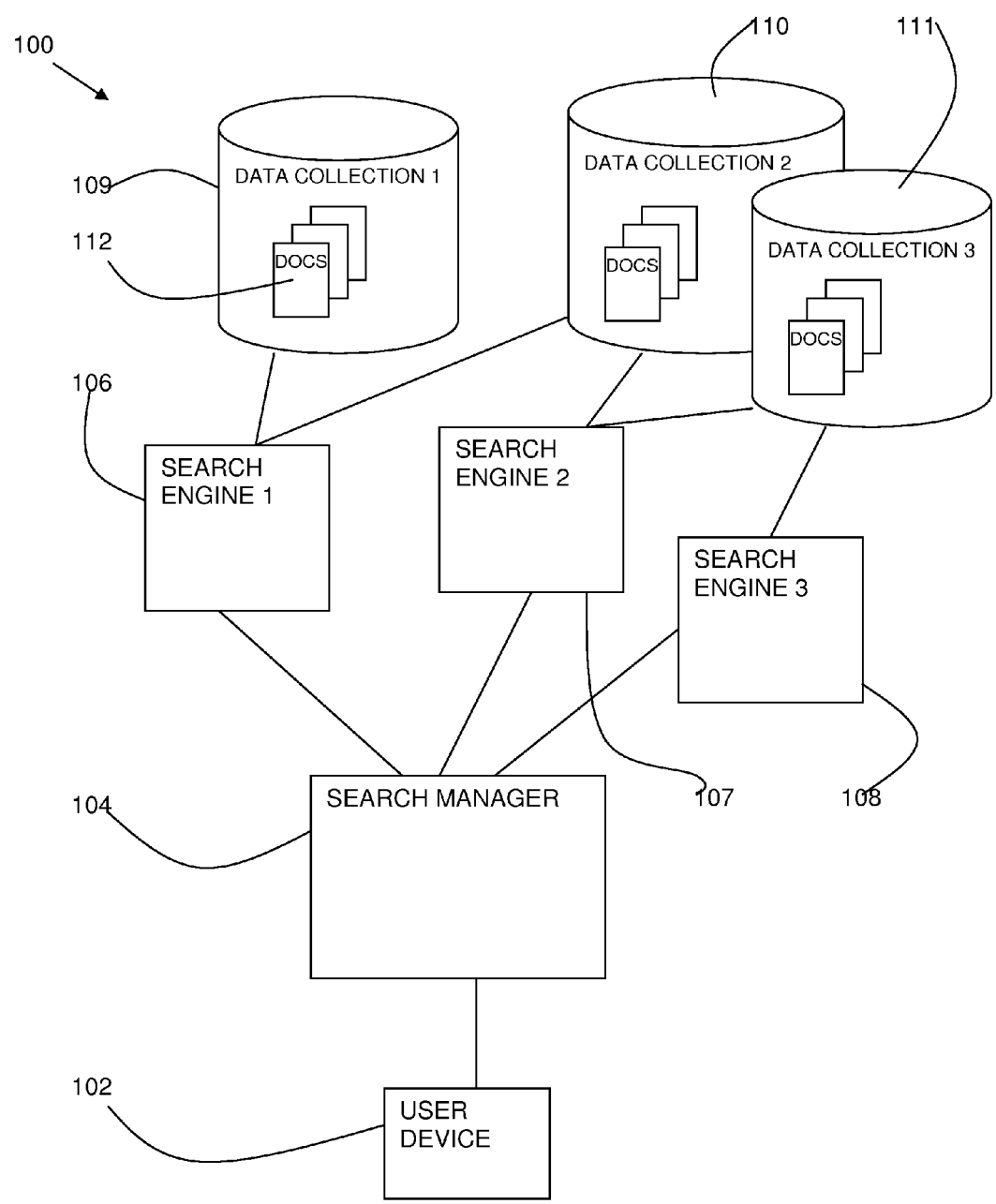
FIG. 1 is a block diagram of a distributed search system in accordance with the present invention.

Referring to FIG. 1, an example of a distributed search system 100 is shown. A user device 102 sends a communication in the form of a search query to search manager 104. The search manager 104 communicates with one or more search engines SE1 106, SE2 107, SE3 108. Each search engine 106-108 may use one or more data collections DC1 109, DC2 110, DC3 111 with referenced documents 112. A metasearch can be carried out using multiple search engines 106-108 querying the same data collection DC2 110. A federation search can be carried out using a single search engine SE1 106 querying several data collections DC1 109, DC2 110. A search engine component can be defined as a combined pair of a search engine 106-109 and a data collection 109-111.

FIG. 1 is a basic representation of a distributed search system 100. It will be appreciated that the distributed search system may take a large number of different forms. Each of the devices may be in communication using network communications; however, devices may also be local to one another. The data collections 109-111 are shown for the purposes of illustration as being defined collections; however, in practice they may be made up of documents spread across networked servers, for example the World Wide Web.

Figure 2A:
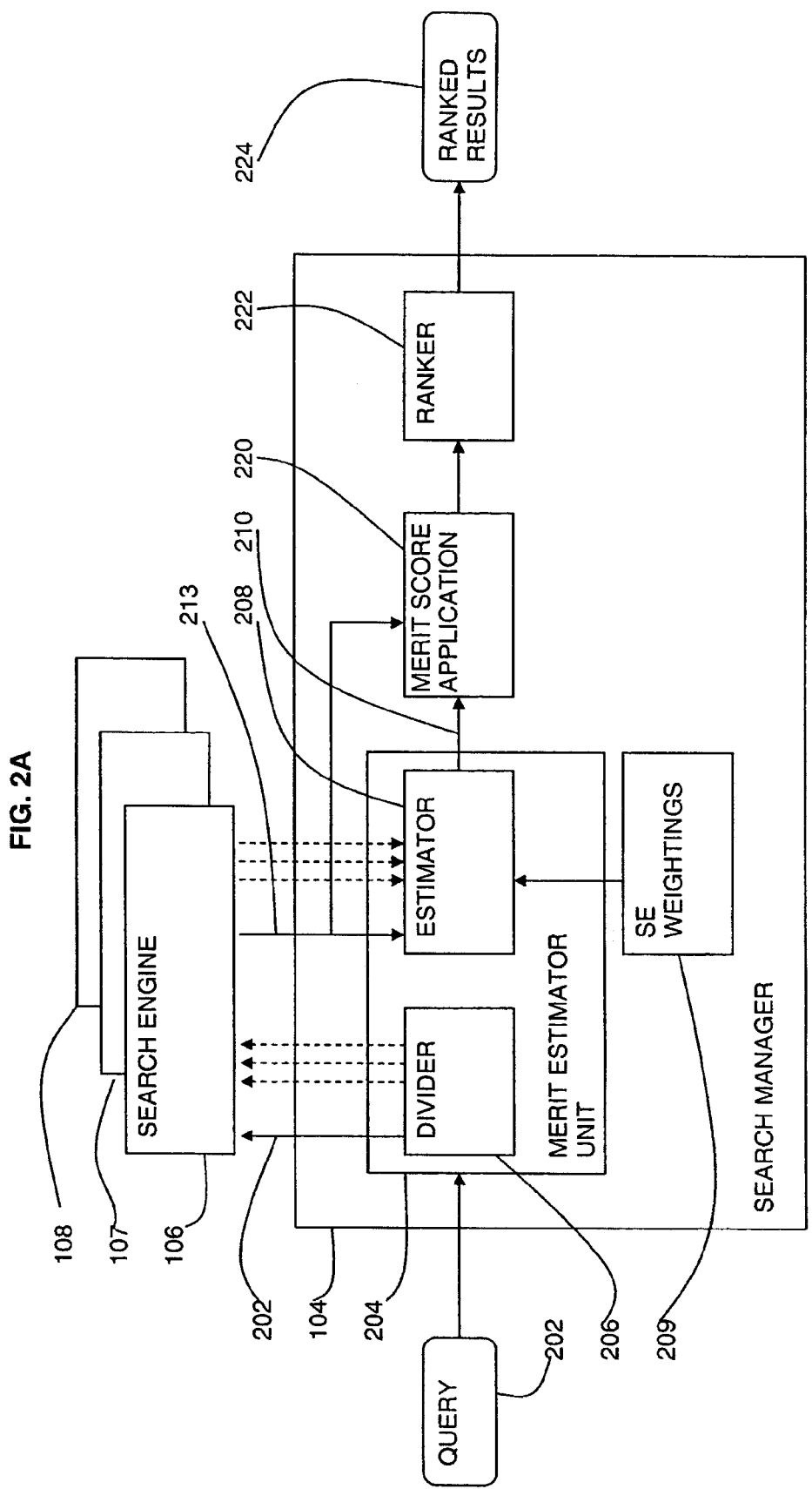
FIGS. 2A and 2B are block diagrams of a search manager of a distributed search system in accordance with the present invention.

FIG. 2A shows a detailed block diagram of the search manager 104. A user inputs a query 202 to the search manager 104 for submitting to one or more search engines 106-108. The search manager 104 includes a merit estimator unit 204 for estimating the success of a search engine working on a data collection for a query. In this description, a search engine and document collection pair is referred to as a component.

The merit estimator unit 204 is based on the difficulty prediction unit disclosed in U.S patent application Ser. No. 10/968,692 (now U.S. Pat. No. 7,406,462) "Prediction of Query Difficulty for a Generic Search". The disclosure of the foregoing application is incorporated by reference into the present application.

The above-noted U.S. Pat. No. 7,406,462 discloses a query difficulty prediction unit which includes a query divider that divides the user's full query into a multiplicity of sub-queries, where a sub-query may be any suitable keyword and/or set of keywords from among the words of the full query. The "keywords" usually are the words of the query excluding prepositions, articles, etc. For example, a sub-query may be a set of keywords and lexical affinities (i.e. closely related pairs of words found in proximity to each other) of the full query.

The query divider provides the full query and the sub-queries to a search engine which generates query documents for each query. A query difficulty predictor receives the documents and compares the full query documents to the sub-query documents and generates a query difficulty prediction value based on the comparison.

Two embodiments of the query difficulty predictor are described in the referenced U.S. Pat. No. 7,406,462. Both embodiments use the features of the overlap between documents located by each sub-query and the full query and the document frequency of each of the sub-queries.

The first embodiment uses an overlap counter, a binary histogram generator, a histogram ranker and a rank weighter. The rank weighter generates a query difficulty prediction value. The overlap counter may count the number of overlapping documents per sub-query. The binary histogram generator may first generate a standard histogram listing the number of times X overlaps occurred within an overlap vector. The binary histogram generator may generate a binary histogram directly or from a standard histogram. The histogram ranker may generate a ranking vector r from the binary histogram. Ranking vector r may list the locations of the binary histogram which have 1's after those which have O's, where the first location of ranking vector r is the first location (starting from location 0) to have a O. It will be appreciated that the histogram ranker may generate ranking vector r directly, if desired. A rank weighter may generate a query difficulty prediction value by performing a vector multiplication between ranking vector r and per search engine and the tuning vector.

The second embodiment uses an overlap counter, a number of appearances determiner and a binary tree predictor. The binary tree predictor may take an overlap vector from an overlap counter and appearance logarithm vector and, together with a per search engine, may determine a query difficulty value. binary tree predictor may implement a decision tree, where each node may store a set of two weights $W_O$ and $W_A$ and a prediction value SE_TREE. Weight $W_O$ may be for an element $O_i$ of overlap vector O and weight $W_A$ may be for an element $A_i$ of appearance logarithm vector A. The prediction value may be the value at the node. The values of weights $W_O$ and $W_A$ and of the prediction values of variable SE_TREE may be per search engine and/or per database and may be generated externally with a particular training set.

The binary tree predictor may begin at a root node of the tree and may move along its branches, each time using the information from one sub-query. At step i, the binary tree predictor may multiply weight $W_O$ at the current node by $i^{th}$ overlap element $O_i$ and may multiply weight $W_A$ at the current node by $i^{th}$ appearance element $A_i$, and may add the two values to get a result R. Mathematically, this may be written:

$$J = W_O O_i + W_A A_i$$

The binary tree predictor may then take one branch, e.g., the left branch, of the tree if the result J is larger than zero and the other branch otherwise. In another embodiment, the binary tree predictor may take the left branch of the tree if the result J is larger than a threshold $T_j$.

The binary tree predictor may end its operation when no more sub-queries exist or when a terminal node is reached. The prediction of difficulty is the prediction value at the node in which the movement was terminated.

In both embodiments of U.S. Pat. No. 7,406,462 the difficulty prediction unit is trained to generate a tuning vector in the histogram embodiment or set of node variables in the binary tree embodiment for a particular search engine. A training unit uses training queries with known target documents to learn a mapping from the overlaps and sub-query DFs to the actual search engine accuracy (for example, P10 or MAP).

Figure 2B:
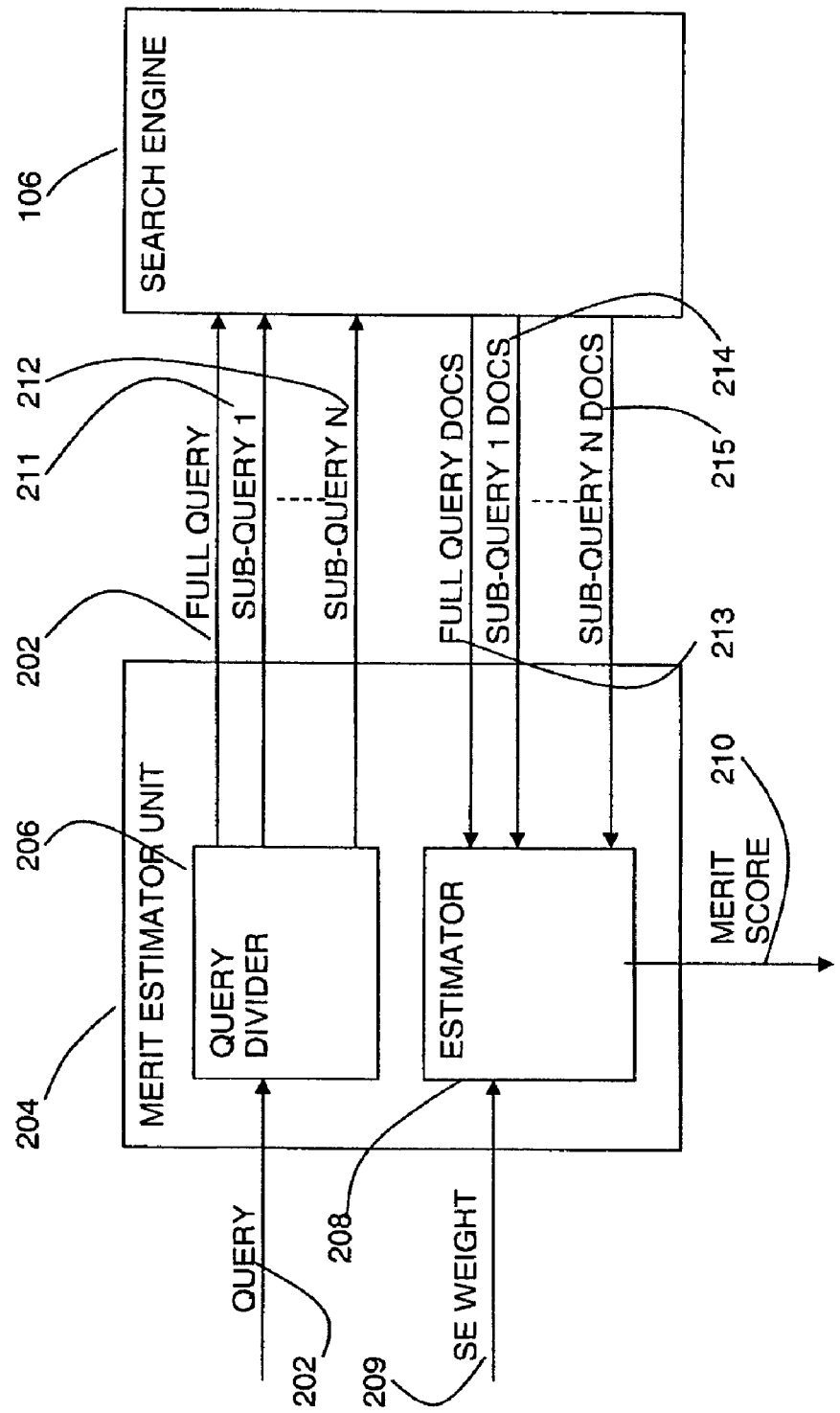

In the present system, a merit estimator unit 204 has a query divider 206 which divides the user's full query 202 into a multiplicity of sub-queries, where a sub-query may be any suitable keyword(s) and/or lexical affinity of the full query. FIG. 2B shows a more detailed view of the merit estimator unit 204 and the communication with a search engine 106. The full query 202 is sent to the search engine 106 as well as a plurality of sub-queries 211, 212. (In FIG. 2A, the full query 202 is shown in solid line and the sub-queries as broken lines.)

The merit estimator unit 204 receives the listed document results returned by the search engine 106 for each of the full query 213 and the sub-queries 214, 215. Data from the listed document results is used by a estimator 208. The estimator 208 uses the features of the overlap between documents located by each sub-query and the full query and the document frequency of each of the sub-queries in conjunction with a search engine weighting 209 for the search engine and data collection used to provide a merit score 210.

The difficulty prediction unit of U.S. Pat. No. 7,406,462 can be used as the estimator 208 of this system using either of the embodiments described therein. In addition, the training unit of U.S. Pat. No. 7,406,462 can be used to generate search engine weightings 209 for each search engine and data collection pair used in the present system The search manager 104 includes a merit score application means 220 which receives the full query document listing 213 from a search engine 106 and the merit score 210 for the query 202 as handled by the particular search engine 106. These inputs are used to provide a list of documents with applied merit scores for the particular search engine 106. This is carried out for each search engine and document collection pair used.

A ranker 222 ranks the documents by their applied merit scores for all the components (the search engine and data collection pairs) used to provide an output of ranked results 224.

The document score (DSs) for a document returned might or might not be provided. In the latter case only a priori knowledge about the document collections can be used. In the former, the DS can be used as additional information and the merit score is applied to the DS.

In the present system, only minimal information is supplied by the search engine operating on a specific document collection, namely, an optional score of documents (i.e. the DSs) and the document term frequency (DF) of all query terms.

For each component a query estimator is trained using a set of training queries to provide the component weightings. This stage is performed once when the system is set up.

Figure 3A:
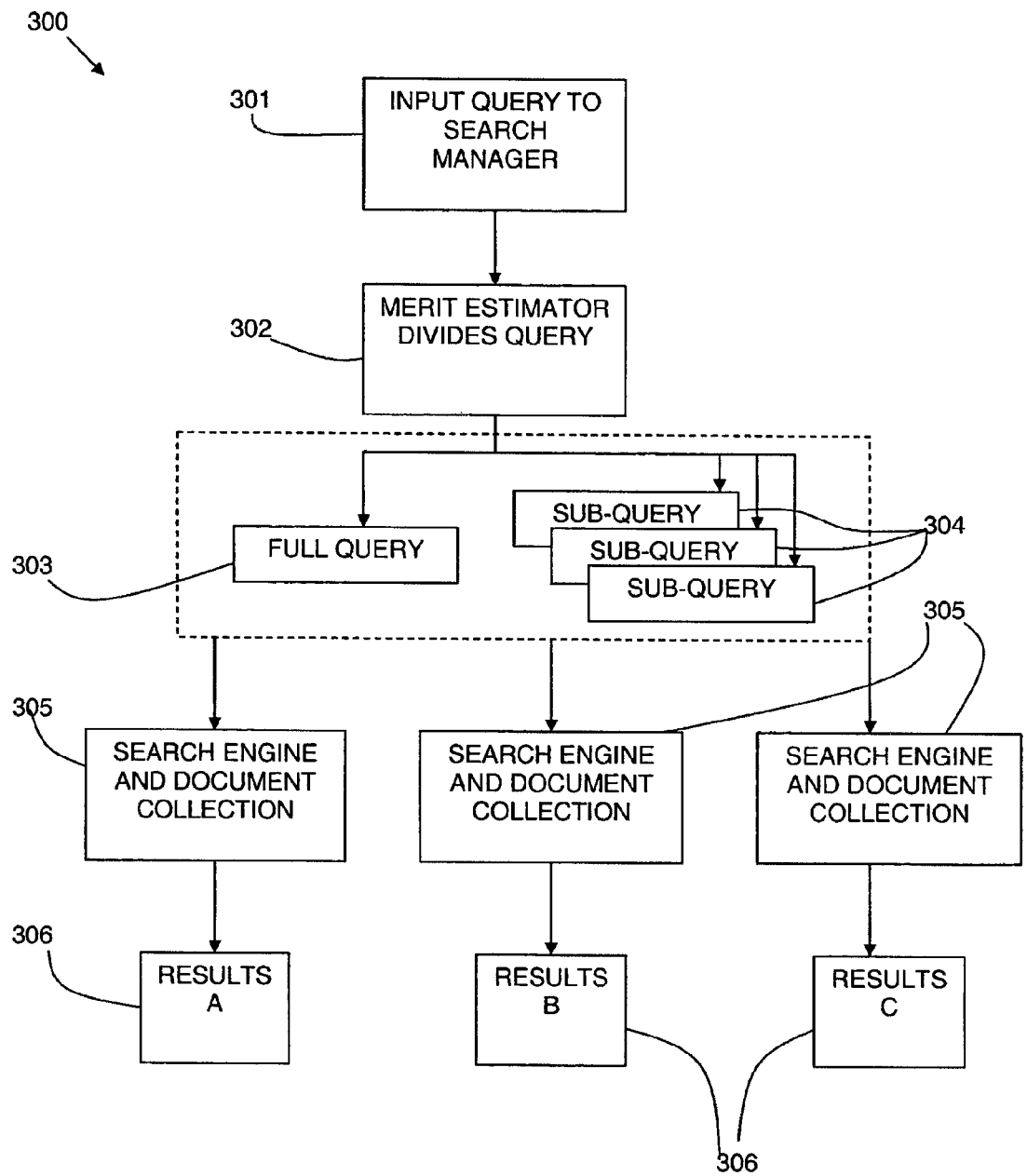
FIG. 3A is a flow diagram of a method of processing queries in accordance with the present invention.

Referring to FIG. 3A, a flow diagram 300 shows the processing of a query from a user. A query is input 301 to a search manager by a user. The merit estimator unit divides 302 the query into the full query 303 and a plurality of sub-queries 304.

The full query 303 and the plurality of sub-queries 304 are input to one or more search engines operating on one or more document collections. The flow diagram shows the inputs into a plurality of components 305. Each of the components 305 returns the top N document results 306 and a document score for each document.

Figure 3B:
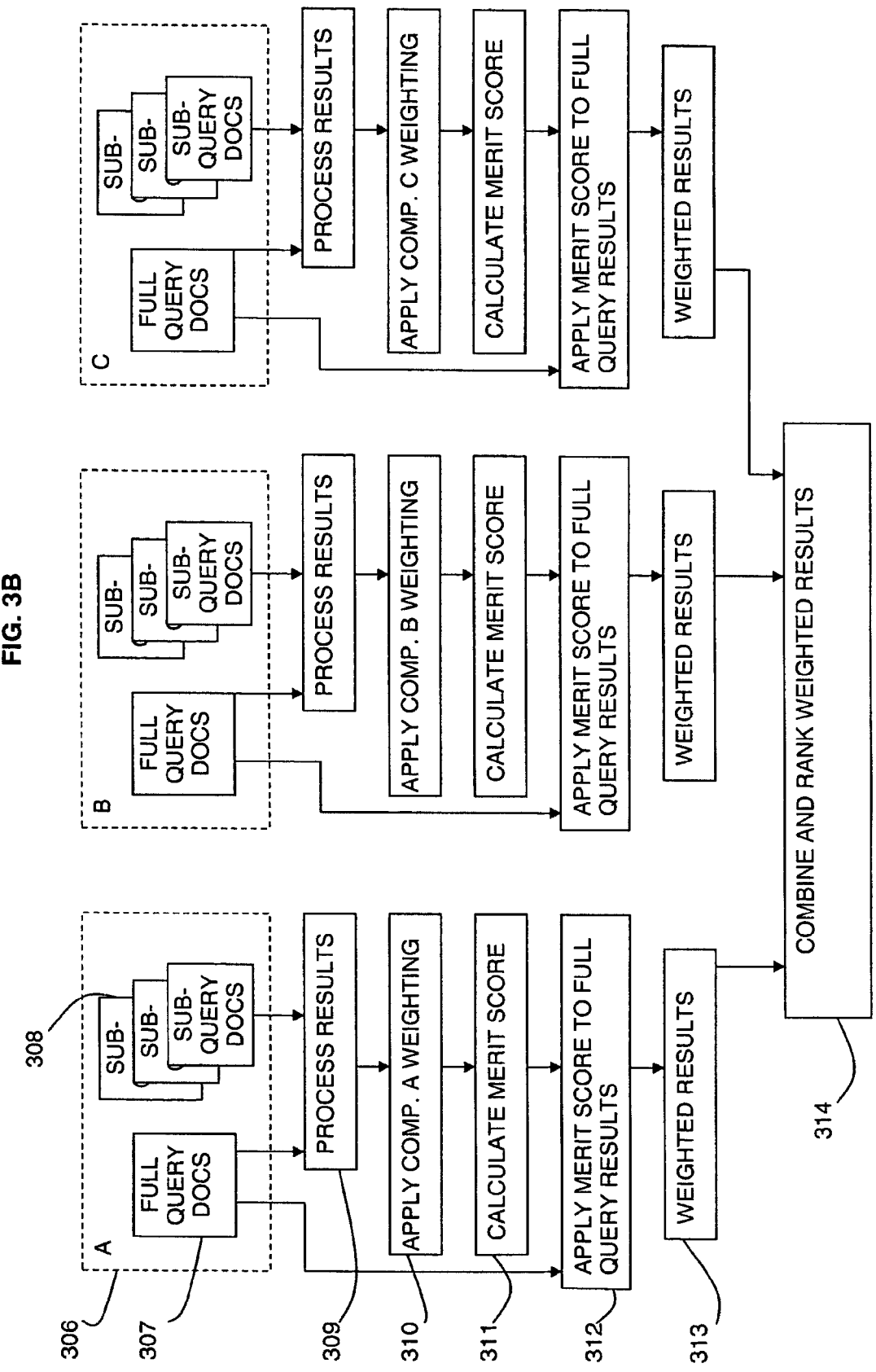
FIG. 3B is a flow diagram of a method of processing query results in accordance with the present invention.

Referring now to FIG. 3B, a flow diagram 400 of the processing of the results is shown. Each result 306 is formed of a top N documents returned for the full query 307 and a top N documents returned for each of the sub-queries 308.

FIG. 3B shows the processing of the results 306 from each of the components 305 in parallel.

In each case, the full query results 307 and the sub-query results 308 are compared and document overlap and document frequency are processed 309. A weighting for the search component, which has been stored since the merit estimator unit was trained, is applied 310 to obtain a merit score 311 for the component for this query. The merit score is applied to the document score for each document of the full query results 312 to provide weighted results 313 for component that retrieved them.

The weighted results 313 for each component are then combined and ranked 314 to provide an output of combined results in order of predicted success for the query.

Figure 4:
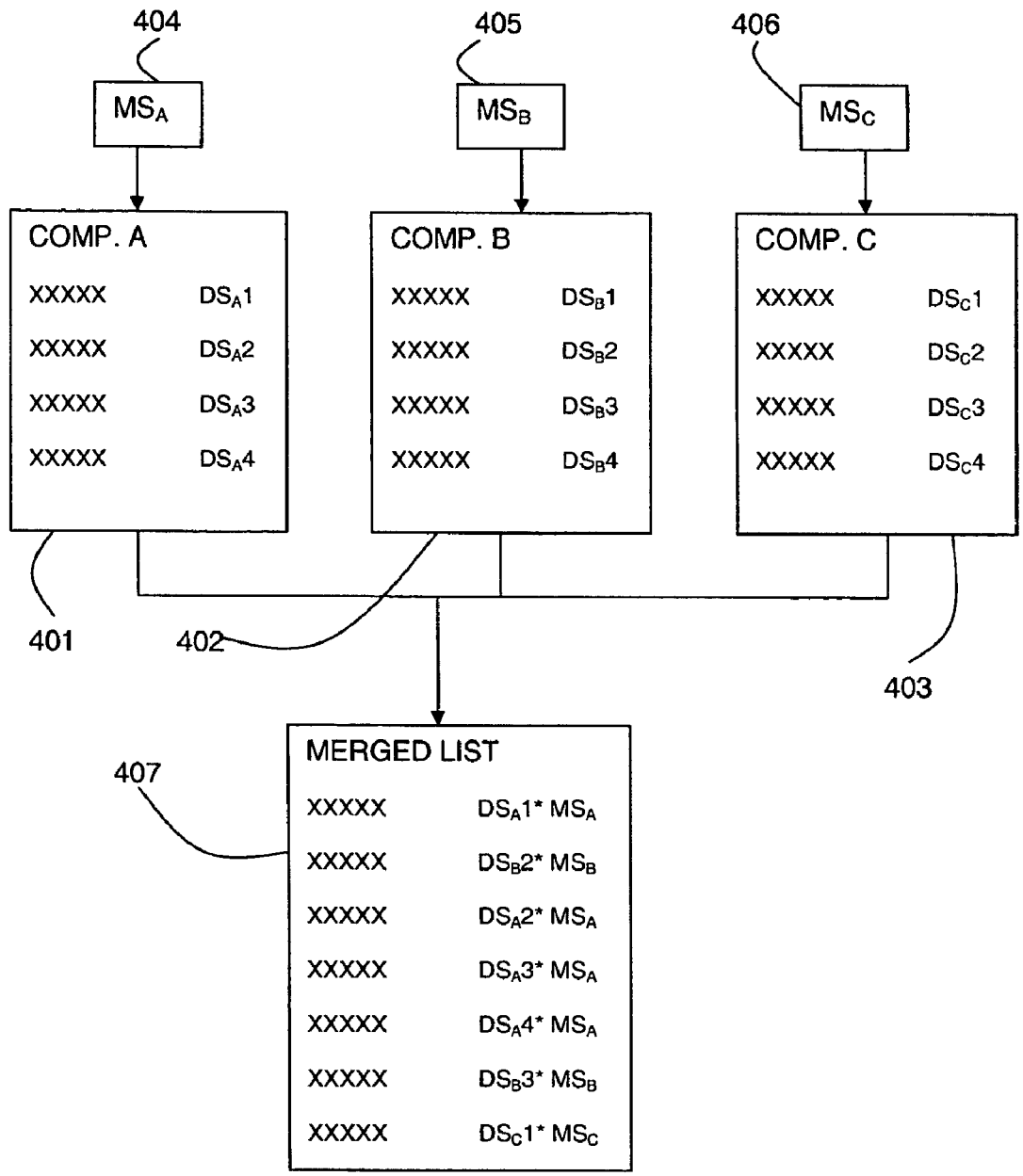
FIG. 4 is a schematic diagram of ranking query results in accordance with the present invention.

FIG. 4 shows a schematic representation of the described document result merging. A plurality of searched components return listed N documents 401, 402, 403 for a query, each of the listed documents having a document score DS. Component A returns a list 401 with DSAs. Component B returns a list 402 with DSBs. Component C returns a list 403 with DSCs. The merit scores for each component for the query are then applied in. Merit score MSA 404 for component A, merit score MSB 405 for component B and MSC 406 for component C. The returned documents are then merged and ranked according to the DS when weighted by the MS for the component to provide a ranked resultant top N documents 407.

In on optional embodiment, an additional step is included by the search manager. Where the variance of merit estimation by the merit estimator is small, the actual difference between the search engine and document collection pair performance may be due to noise rather than information. In such cases, the merit estimation may be ignored and merging by document scores simply carried out.

However, in the cases where variance is greater and the merit estimator identifies one or more of the search engine and document collection pairs as being better than others, it is useful to use the merit estimation as a weight.

Figure 5:
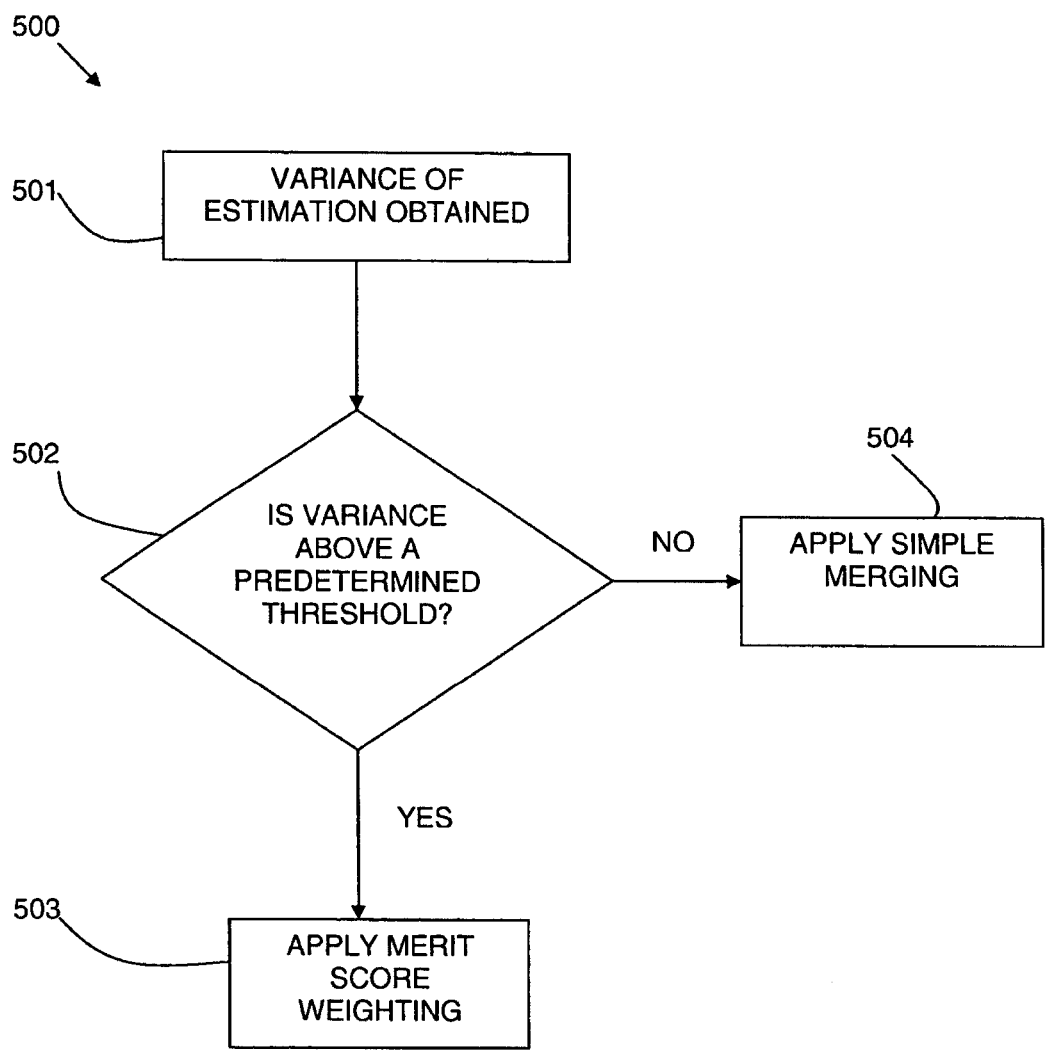
FIG. 5 is a flow diagram of a method of switching between processing methods in accordance with an aspect of the present invention.

FIG. 5 shows a flow diagram 500 of a method of determining if the merit estimator should be used. A measure of the variance of the merit scores from the components is obtained 501. It is determined 502 if the variance is above a predetermined threshold. If so, the merit score weighting is applied 503. If not, simple merging is used 504, for example, using the CORI merging method (J. Callan, Z. Lu, and W. Croft, "Searching distributed collections with inference networks.", in proceedings of the 18th Annual International ACM SIGIR Conference on Research and Development in Information Retrieval, pages 21-28, Seattle, Wash., 1995.).

The search manager is described as a distinct unit for the purposes of explanation but may be formed of a combination of software components themselves distributed in a computer system.

The search manager and the method of processing combined results can be applied in the field of metasearch where multiple search engines search the same collection. It can also be applied in the field of federation where a single search engine searches different collections. A combination of metasearch and federation may also be used with multiple search engines searching multiple collections. The weighting has been described as being provided for a component pair of search engine and document collection. Where a single collection is used by different search engines, the weighting may be per search engine. Similarly, if a single search engine is used, the weighting may be per document collection.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

The present invention may be provided as a service to a customer over a network. In particular, the service may provide merged search results from a plurality of components in a ranked order to a customer in response to a submitted search query.

Improvements and modifications can be made to the foregoing without departing from the scope of the present invention.

We claim:

1. A method of merging results in distributed information retrieval, comprising:
    dividing a full query as input by a user into a multiplicity of sub-queries, wherein the sub-queries each comprise a set of keywords of the full query;
    submitting the full query and the multiplicity of sub-queries to each of a plurality of components, wherein a component comprises a search engine operating on a hardware processor and working on a document collection stored in one or more databases;
    receiving results of the full query and sub-queries from each component in the form of a list of documents, wherein the results for the full query and the results for the sub-queries from each component have document scores (DS) to which a merit score is applied;
    estimating a success of the components in handling the full query to generate the merit score for a component per query, wherein estimating the success includes determining an extent of overlap between results for the full query and results for the sub-queries for each of the components, wherein determining the extent of overlap comprises generating a binary histogram of an overlap vector of the extent of overlap; and multiplying a per search engine tuning vector with a ranked version of the binary histogram;
    applying the merit score to the results for the full query for the components, respectively, wherein the merit score is applied if the variance is above a predetermined threshold level;
    merging the results for the full query produced by the plurality of components by ranking the results for the full query in order of the applied merit scores.

2. A method according to claim 1, wherein the results for the full query and the results for the sub-queries from each component have document scores (DS) to which the merit score is applied.

3. A method according to claim 1, wherein estimating the success of a component in handling the full query includes applying a predetermined component weighting.

4. A method according to claim 3, wherein the predetermined component weighting is obtained by estimating the success of a component in handling a plurality of queries with known results.

5. A method according to claim 1, wherein the sub-queries are at least one of the following: keywords, lexical affinities, synonyms and dictionary definitions.

6. A method according to claim 1, wherein the method includes: determining whether or not to apply the merit score to the results based on a variance of merit scores across the components.

7. A method according to claim 6, wherein the merit score is applied if the variance is above a predetermined threshold level.

8. A method of providing a service to a customer over a network comprising:

dividing a full query as input by a user into a multiplicity of sub-queries, wherein the sub-queries each comprise a set of keywords of the full query;

submitting the full query and said multiplicity of sub-queries to each of a plurality of components, wherein a component comprises a search engine operating on a hardware processor and working on a document collection stored in one or more databases;

receiving results of the full query and sub-queries from each component as a list of documents, wherein the results for the full query and the results for the sub-queries from each component have document scores (DS) to which a merit score is applied;

estimating a success of a component in handling the full query to generate the merit score for a component per query, wherein estimating the success of a component in handling the full query includes determining an extent of overlap between results for the full query and results for the sub-queries, wherein determining the extent of overlap comprises generating an appearances vector corresponding to a number of times each of the keywords appears in the document collection; and moving through a tree of weights using an overlap vector of the extent of overlap and the appearances vector to generate a query difficulty prediction;

applying the merit score to the results of the full query produced by the components, respectively, wherein the merit score is applied if the variance is above a predetermined threshold level; and merging the results for the full query produced by the plurality of components by ranking the results for the full query in order of the applied merit scores.

9. A method according to claim 8, wherein estimating the success of a component in handling the full query includes applying a predetermined component weighting.

10. A method according to claim 9, wherein the predetermined component weighting is obtained by estimating the success of a component in handling a plurality of queries with known results.

11. A method according to claim 8, wherein the sub-queries are at least one of the following: keywords, lexical affinities, synonyms and dictionary definitions.

12. A method according to claim 8, wherein the method includes: determining whether or not to apply the merit score to the results based on a variance of merit scores across the components.

* * * * *